E. P. COWLES.
VARIABLE SPEED FRICTION GEARING.
APPLICATION FILED FEB. 21, 1903. RENEWED MAY 26, 1913.
1,067,408.
Patented July 15, 1913.
2 SHEETS—SHEET 1.
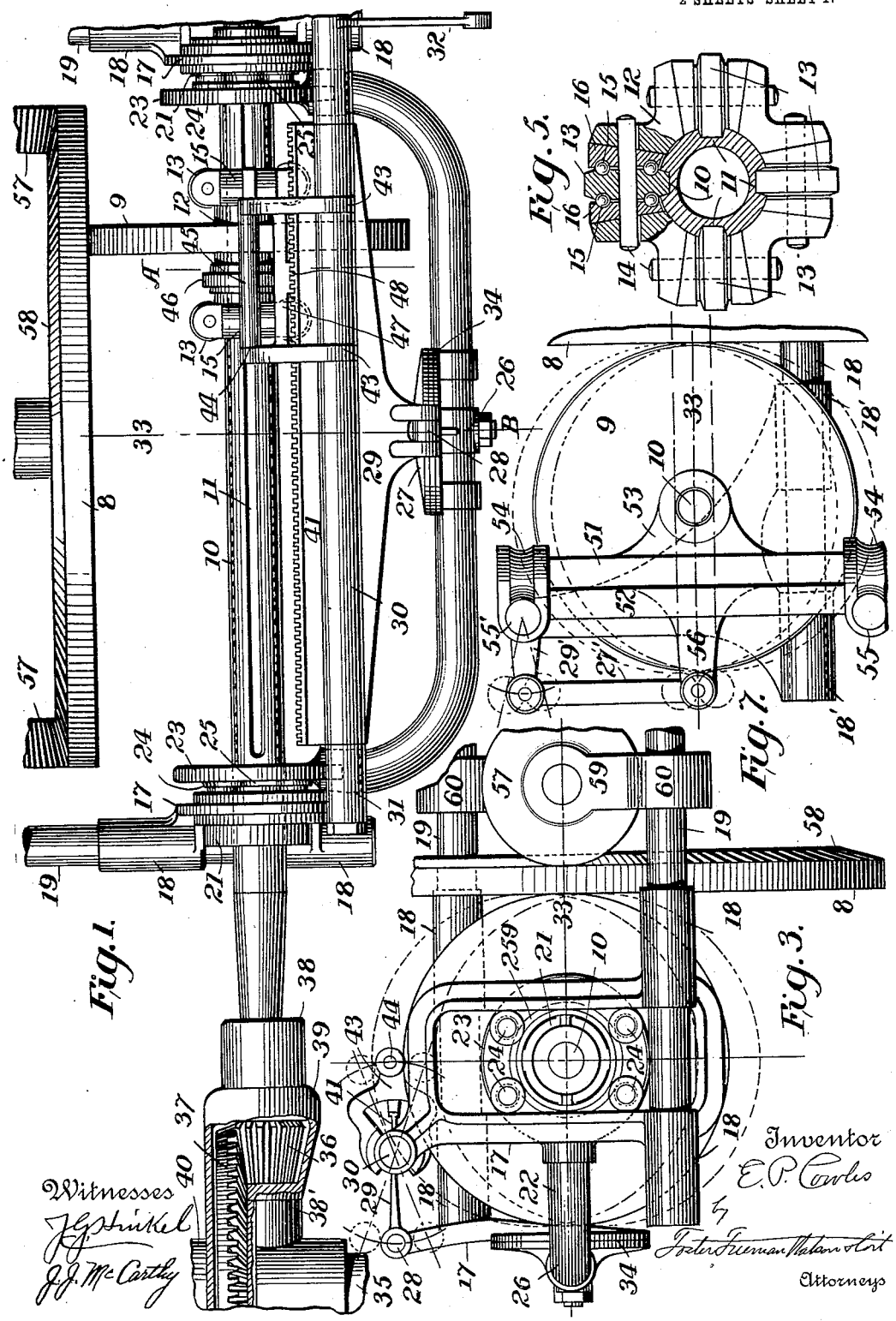

E. P. COWLES.
VARIABLE SPEED FRICTION GEARING.
APPLICATION FILED FEB. 21, 1903. RENEWED MAY 26, 1913.
1,067,408.
Patented July 15, 1913.
2 SHEETS—SHEET 2.
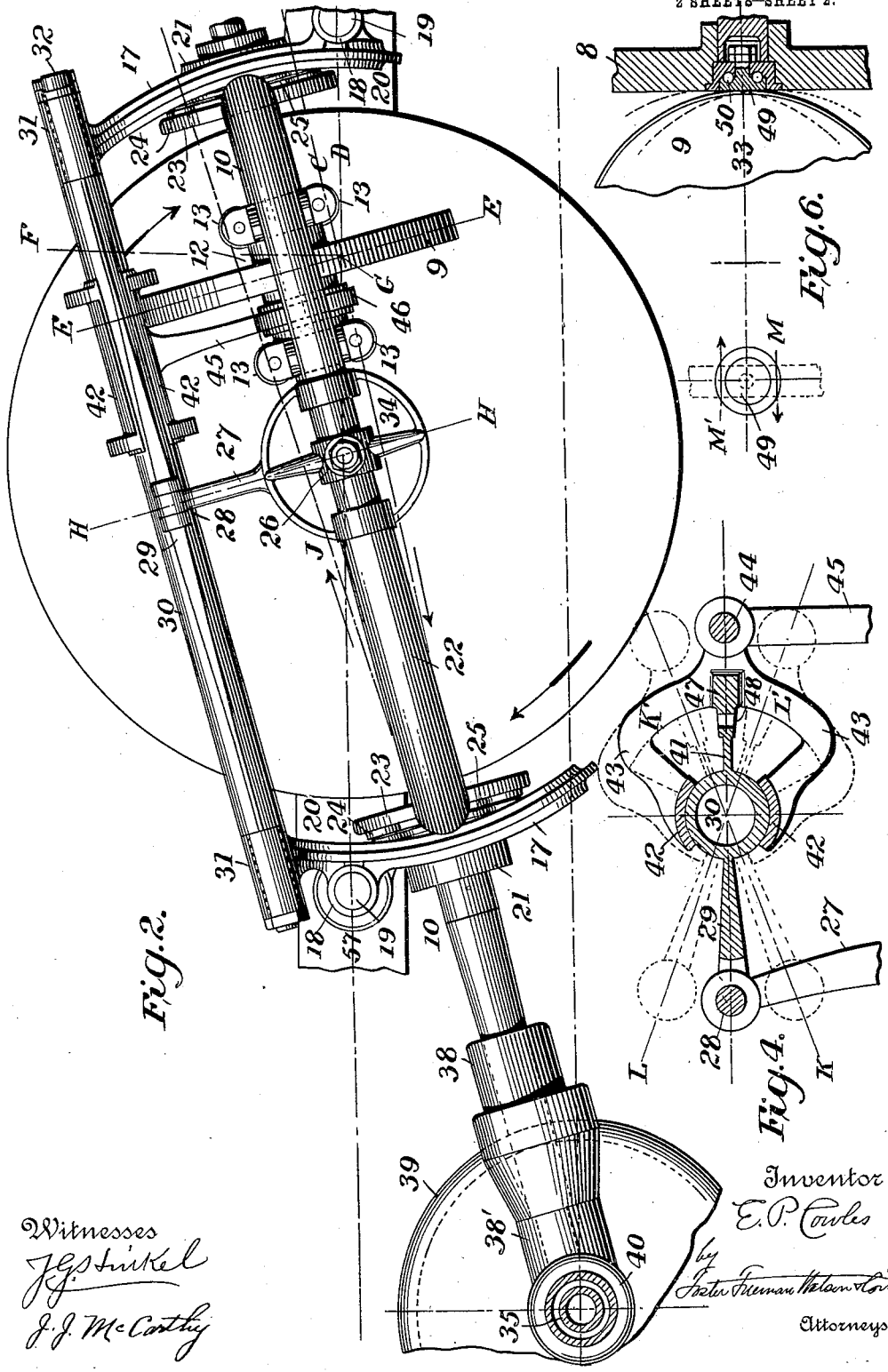

UNITED STATES PATENT OFFICE.

EDWARD P. COWLES, OF WARREN, OHIO.

VARIABLE-SPEED FRICTION-GEARING.

1,067,408.  Specification of Letters Patent.  Patented July 15, 1913.

Application filed February 21, 1903, Serial No. 144,522. Renewed May 26, 1913. Serial No. 770,057.

*To all whom it may concern:*

Be it known that I, EDWARD P. COWLES, a citizen of the United States, residing at Warren, in the county of Trumbull and State of Ohio, have invented certain new and useful Improvements in Variable-Speed Friction-Gearing, of which the following is a specification.

My present invention relates to variable speed friction transmissions, with the object of improving and simplifying the variable speed friction transmission illustrated in my application, Serial Number 125,930, filed Oct. 4, 1902; and consists, first of a novel means for varying the revolving plane of the friction wheel from a position perpendicular to a radius of the friction disk passing through point of contact to cause the friction wheel to traverse automatically entirely across the face of the friction disk, either way, without disengaging or slipping; second, of means for locking the friction wheel from traversing or "creeping" while contacting with the disk on the diametrical working line; third, means whereby the friction wheel can be stopped, and held fast at the center of the friction disk, without disengaging or slipping any part; fourth, an arrangement of parts whereby an unbroken transmission shaft can be used between friction wheel and driving axle, dispensing with universal or flexible joints, extensible parts, couplings, clutches or disconnecting devices, etc.; fifth, an arrangement of parts whereby the turning effort of disk on friction wheel, and of the transmission shaft on the driving axle, counter balance each other; sixth, a pivotal arrangement of parts whereby the vertical vibration of the transmission shaft, due to the up and down play of the body, has no effect to change the plane of revolution of the friction wheel from a position perpendicular to the radius of the disk passing through the point of contact of said wheel and disk, and the turning strain on the driving axle and friction wheel due to same cause is partially compensated.

The invention consists further in various improvements in construction and arrangement of parts, and in specific devices for effecting the various movements, all of which will be fully described in the following specification, reference being had to the accompanying drawings, in which—

Figure 1 is a top view of one embodiment of my invention; Fig. 2 is a side view of the same; Fig. 3 is an end view; Fig. 4, is a section through the locking device, on the lines A, B, Fig. 1; Fig. 5 is a view, partly in section, of the end of friction wheel hub; Fig. 6 shows the central pivot in disk for stopping and holding the friction wheel; Fig. 7 illustrates a modification of the invention.

Referring to the drawings, 8 indicates a driven friction disk, preferably the balance wheel of the motor. Engaging frictionally with the face of said disk is a friction wheel 9, the hub of which slides freely on a shaft 10, but is rotatively rigid with it. To permit this the shaft and wheel hub can be connected by the usual slot and feather, or the shaft can be grooved like "pinion wire" and the hub of the friction wheel 9 provided with inwardly projecting teeth sliding in such grooves as shown in my application, Serial Number 125,930, filed October 4th, 1902. Preferably, however, I cut about four grooves 11, in shaft 10, and provide each end of the friction wheel hub 12 with four antifriction rollers 13, to run in said grooves. Rollers 13 revolve on pivots 14, and are also provided with ball bearings 15, interposed between their sides and wedge shaped blocks 16, so that by moving the pivots 14, toward the center, the wear is taken up all around. The pivots 14 take the strain of pressure against disk 8 and the ball bearings 15, that of the turning effort, so that the friction wheel 9 slides easily on shaft 10, while doing its heaviest work.

It will be seen that by the construction just described the antifriction devices are practically under the periphery of the friction wheel at all times. That is the rollers 13 and balls 15 occupy the same position relative to wheel 9 at every point in the travel of said wheel. The friction wheel is required to traverse the guide 10 for a considerable distance and if it were supported by ball bearings of ordinary construction, which are free to travel relative to the wheel and as is well known move at one half the speed of the wheel supported by them, the bearings would pass from under the wheel before it reached the limit of its travel in either direction and would therefore be useless.

Shaft 10 and friction wheel 9 are supported, and the latter held in frictional contact with disk 8 by two link like brackets 17, provided with sleeves 18 sliding on bars 19, projecting from the motor frame 20, on either side of disk 8, and having their axes perpendicular to face of said disk. Said brackets 17 are provided with means (not shown) for moving them toward the face of disk 8, to take up wear, and regulate the pressure of friction wheel 9 on said disk which means may be similar to that shown in my aforesaid application Serial Number 125,930.

Two rollers 57 of relatively large diameter and made of some non-resonant material like rawhide bear against the opposite face or side of disk 8 from that engaged by friction wheel 9, near the periphery of said disk and on a diametrical line parallel with the axis of shaft 10. Said rollers have beveled faces, and bear on a beveled surface 58 on disk 8, so that they run without friction or noise and they counteract the thrust of disk 8, caused by pressure of friction wheel 9. The bearings 59 of said rollers are firmly attached to bars 19 at 60, Fig. 3, so that the strain of maintaining wheel 9 in frictional contact with disk 8, is confined wholly to brackets 17, bars 19, and friction rollers 57, relieving the motor frame, crank shaft, and other parts, of this strain.

Shaft 10 has bearings 21 in brackets 17. These bearings are cylindrical with rollers or balls inside for shaft 10 to bear against while their outer faces roll on the inner sides of the links of brackets 17, so that they perform the double function of roller bearing for shaft 10, and roller bearing on brackets 17. As the ball or roller bearings within the cylinders 21 may be of any of the forms commonly in use they are not illustrated. Said bearings 21 are sustained by a bail 22, and to allow the bearings to turn freely the bent ends of bail 22 are made in the form of flat rings 23, concentric with the bearings and shaft 10, and these rings are provided with grooved rollers 24, which engage a flange 25 projecting from the inner end of bearings 21.

Bail 22 is pivoted at its center 26 to an upwardly extending link 27, the upper end 28 of which is pivoted to an arm 29, extending horizontally from a rock shaft 30, having bearings 31, in the upper ends of link brackets 17. On the upper or forward end of this rock shaft is secured an arm 32, having suitable connections (not shown) with a lever conveniently accessible to the operator, by which to rock shaft 30. In the normal working position of bail 22, and shaft 10, the axis of pivot 26, lies in an extension of the axis 33, of disk 8, and the effect of rocking shaft 30, is to shift the axis of shaft 10, and friction wheel 9, above or below axis 33 of disk 8 as is obvious. Pivot 26 is provided with circular plates 34, like a "fifth wheel" to give stability to bail 22, as is obviously necessary, owing to its curved form, and this stability is enhanced by rollers 24, bearing on the inner surfaces of link brackets 17. Preferably a ball bearing would be interposed between plates 34.

The lower or back end of transmission shaft 10 extends unbroken to the live driving axle 35, and is provided with a bevel pinion 36, Fig. 1, which meshes into a bevel wheel 37, secured to the driving axle. Shaft 10 has bearings 38, 38' on either side of the pinion 36, secured in the gear case 39, and this gear case has bearings 40 on the axle 35, so that the gear case 39 and shaft 10, can swing vertically while the two extended bearings 38, 38' give the shaft sufficient stability to resist the effort of turning the driving wheels. Shaft 10 has also a limited play endwise through bearings 21, in brackets 17. This with its vertical play just described, accommodate the movement of the motor up and down, as the carrying springs yield in passing over rough roads.

It will be seen from the foregoing that shaft 10 is adapted to three different movements—oscillating about pivot 26—up and down with respect to axis of disk (the cylindrical bearings 21, permitting such movements without friction) and a limited end play.

The present invention is particularly adapted for use in connection with motor vehicles and in describing the operation of the several parts it will be assumed that the invention is thus embodied.

In operation and the parts being in the position shown in Figs. 1 and 2, with the disk 8, turning in the direction shown by the curved arrows on Fig. 2, the vehicle would be moving forward with a medium speed. The axis of shaft 10, occupying its normal working position would cut the axis 33, of disk 8. Any up and down motion of the vehicle body and motor would cause the axis of shaft 10 to oscillate about pivot 26, which lies in a prolongation of axis 33 of disk 8 and would carry the friction wheel 9, with it and also the radius in disk 8, passing through the point of contact of friction wheel 9, with said disk and, therefore, the rotating plane of friction wheel 9 would invariably remain perpendicular to said radius throughout all such oscillations and there would be no tendency for the friction wheel to traverse to or from the center of disk 8. If now the operator should rock shaft 30 to (for instance) lower friction wheel 9 below its diametrical working line on disk 8 so as to bring the axis of shaft 10 to the broken line C Fig. 2, the radius of disk 8 passing through the point of contact of the friction wheel with said disk would be that indicated by the line D. Therefore the rotating plane of the friction wheel would no longer be perpendicular to the radius of the disk 8 including the point of contact between said disk and wheel but would be at such an angle that the wheel 9 would traverse automatically toward the center of disk 8, entirely across the face thereof, following the broken line C, in the direction of the arrow, decreasing in speed as it approaches the center, and reversing the motion of friction 9 as it passed the center line H. In Fig. 2 it is assumed that the line E E, indicating the plane of rotation of the wheel 9, is perpendicular to both the lines C and J as well as the diametrical working line of the disk 8. This has been done to prevent obscuring the drawings by the addition of the lines required to exactly show the several rotating planes of the disk when its axis is moved to the lines C and J; and because the movements and several positions of the wheel 9 are clearly and in detail set forth in my aforesaid application Number 125,930. With the above in mind it will be understood that the line F, G indicates a plane which is perpendicular to the plane of the radius D which includes the point of contact between the disk and wheel contained in the line C, which point of contact is indicated by the letter G; and when the wheel 9 is moved as above described its plane of rotation will be separated from the plane perpendicular to the radius D by the angle E, G, F. If now the operator rocks shaft 30, so as to raise friction wheel 9, and bring axis of shaft 10 to the broken line J, it is obvious that friction wheel 9 will automatically traverse in the direction of the arrow adjacent said line entirely across the face of disk 8 to the right side, again reversing as it passes central line H, and increasing in speed as it leaves the center.

It is obvious that when friction wheel 9 has traversed to the point desired, unless rock shaft 30 were moved back to bring the revolving plane of friction wheel 9, mathematically exactly perpendicular with the radius in disk 8, passing through the point of contact, it would "creep" slowly one way or the other. To overcome this it is necessary to employ means for locking friction wheel 9 from traversing when on the diametrical working line on face of disk 8. In the present instance I accomplish this by the locking device shown in Fig. 3, and enlarged section Fig. 4. Projecting from the side of rock shaft 30, diametrically opposite to arm 29, is a wing 41, extending the entire length of shaft 30, having on its outer edge teeth like a rack. Sliding and turning freely on shaft 30 is a sleeve 42, having its sides cut away to play over wing 41, and arm 29. From this sleeve extend the arms 43, 43, toward disk 8. At a point 44 nearly over axis of shaft 10, they are pivoted to an upright 45, having a ring 46 on its lower end engaged in a groove in hub 12, of friction wheel 9. Arms 43 are connected by a bar 47, provided with several teeth 48, which intermesh with those on rack 41 when rocker arm 29, and wing 41 are in a horizontal position and friction 9 on the diametrical working line on face of disk 8. Sleeve 42 and pivot 44 are of a length to give sufficient stability to resist any tendency of friction 9 to traverse in either direction when locked in this position. When shaft 30 is turned to lower friction wheel 9 arm 29 is in position shown in broken lines $k$, Fig. 3, and wing 41, is raised as shown at K', while arms 43 and teeth 48 are lowered as shown at L', unlocking sleeve 42, and allowing it, and friction wheel 9, to traverse. When shaft 30 is turned in the opposite direction bringing arm 29 into position shown by broken lines L, rack 41 is at L' and teeth 48 at K'; in other words rack 41, and teeth 48, move in opposite directions. Owing to this double motion, a slight movement of shaft 30, serves to unlock sleeve 42.

When friction wheel 9 approaches the center of disk 8, from the right if it is moved up on to the diametrical working line when it is ¼ or ½ inch from center of the disk, friction wheel 9 will continue to revolve, but so slowly that the motion imparted to the running gear is negligible, coming practically to a stop and for short stops where it is desirable to let the motor continue running the movement of the vehicle would be so slight that it would not be a source of inconvenience. In this position the slow movement of friction 9 prevents wearing a plane surface on the face or "spotting." It is obvious that if from this position friction wheel 9 were raised or lowered it would continue to traverse reversing and backing or moving forward with increasing speed, according to whether it were raised or lowered. If however a construction is desired whereby the vehicle can be brought to a dead stop and held so without disconnecting or releasing any part or wearing a face on friction 9 I would employ the means shown in Fig. 6 in which 49 indicates a circular plate or pivot about 1¼ inches in diameter turning freely in the center of disk 8, its face flush with the face of said disk. Preferably a ball bearing 50 is interposed between its back face and the disk to take the pressure of friction 9. As friction wheel 9 approaches the center of disk 8 it is raised or lowered according as it approaches from the right or left and runs onto pivot 49, following the broken lines M or M' as shown by arrows, where it is held stationary and fast by pivot 49 around which disk 8 turns the pivot remaining stationary. When friction wheel 9 is raised or lowered from this position it runs off from pivot 49 onto the disk and traverses to the right or left.

In Fig. 7 I have shown a different arrangement of my invention. In this case friction wheel 9 is maintained substantially the same as shown in my application Serial No. 125,930, supports 51, 52, being rectangular instead of circular or ringlike. Friction wheel 9 has bearing 53 extending from support 51 and this support slides vertically on 52 which is provided with sleeves and rollers 54 to slide horizontally on guide bars 55, supported in brackets 18' and bars 19', substantially the same as described in connection with Figs. 1, 2, and 3. Extending back from support 51 are two arms 56 to which is pivoted a link 27'. The upper end of link 27' is pivoted to an arm 29' extending from the upper guide bar 55' which in this case performs the double function of rock shaft and guide bar. The locking device can be substantially the same as described in connection with Fig. 4. The transmission shaft can be extensible and connected to friction wheel by universal joint, substantially as shown in the application referred to, or it can be an unbroken shaft as described in connection with Figs. 1, 2 and 3 connected to friction 9 by a hub and joint similar to my patent universal joints 317,737, May 12, 1885.

The part of the invention which relates to pivotal support 26 link brackets 17 cylindrical bearings 21, bail 22, hub shown in Fig. 5 unbroken shaft 10, bevel gears 36, 37, with extended bearings 38, 38' are well adapted and applicable to my variable speed gearing application, Serial No. 137,369, filed Dec. 31, 1902.

It will be observed that in the arrangement shown the effort of turning driving axle acts to turn transmission shaft 10 up while the force exerted by disk 8 to turn friction wheel 9 forces it down these two opposing forces very nearly counterbalance each other and vary in intensity together so that the power required to raise or lower friction wheel 9 is very small at all times, and also by this arrangement the motion of the body and motor up and down as the carrying springs yield as hereinbefore stated oscillate shaft 10 on pivot 26. This rolls friction wheel 9 slightly back and forth on face of disk 8. The same motion also rolls pinion 36 on bevel wheel 37 and the two always roll in the same direction so that they very nearly compensate each other and relieve the driving gear from shocks and strains from this source. When the friction wheel 9 is near the periphery of disk 8 and the vehicle is moving with its greatest speed and these shocks are severest, the two wheels 9 and 36 almost wholly compensate this strain.

The diameter of friction wheel 9 is preferably about twelve inches and shaft 10 is geared to driving axle 35, about 5 to 1, so that practically friction wheel 9 is 60 inches in diameter. Obviously very little friction is required between wheel 9 and disk 8 to propel the vehicle. It will be observed that friction wheel 9 is never disconnected from the motor, and there are no intermediate clutches or disconnecting devices of any sort between propelling wheels and motor. For this reason no brake is required. The friction wheel traversing toward center of disk, effectually checks and controls the speed of the vehicle. All the functions of regulating the speed, braking, stopping, reversing, etc., are performed without coupling or uncoupling any part or disconnecting the motor from the propelling wheels in any manner, and without slipping friction wheel 9 on face of disk 8.

In going down inclines, checking the speed, etc., the momentum of the vehicle is thrown on the motor, power being transmitted from the running gear to the motor. The friction of the motor has such a great leverage on this power when transmitted in this direction, that it is practically neutralized, when friction wheel 9 is near the center of disk 8, but when it is near the periphery it might increase the speed of the motor beyond a safe limit. To obviate this I would use an automatic balance wheel brake, substantially as shown in my application, Explosive engines, Serial No. 118,002.

It will be evident that many changes in the details of construction and arrangement of the apparatus hereinbefore described can be made without departing from the spirit and scope of my invention. Thus for instance other means of mounting the friction wheel so that its plane of movement may be adjusted angularly, and the point of contact shifted, may be substituted for those shown, equivalent devices may be substituted for raising or lowering the friction wheel and other forms of support for movement parallel with face of disk, and adjusting pressure may be introduced in place of those shown. I intend in the broader claims of this specification to cover all such equivalent devices, and in the more specific claims to cover the particular devices illustrated and described, and which at the present time seem to be the best embodiment of the invention.

Having thus described the invention what is claimed and desired to be secured by Letters Patent is:—

1. In a variable speed friction gearing, the combination of a rotatable disk, a friction wheel engaging said disk, means for adjusting said wheel to and from the center of the disk, and means for positively holding the wheel against movement transversely of the disk when the radius of the disk passing through the point of contact of the wheel and disk is perpendicular to the plane of revolution of the wheel.

2. In a variable speed friction gearing, the combination of a rotatable disk, a wheel frictionally engaging one face of the disk, means for moving said wheel transversely of the disk while engaged therewith, and means for positively preventing such movement of the wheel relative to the disk when the radius of the disk passing through the point of contact of the wheel and disk is perpendicular to the plane of revolution of the wheel.

3. In a variable speed friction gearing, the combination of a rotatable disk, a wheel frictionally engaging one face of the disk, means for holding the wheel in position with its plane of revolution perpendicular to the radius of the disk extending through the point of contact between the wheel and disk, and means for releasing said holding means and adjusting the wheel to cause it to automatically traverse the disk.

4. In a variable speed friction gearing, the combination of a driving disk, a driven shaft, an unbroken transmission shaft geared to the driven shaft, a friction wheel engaging the driving disk, and means connecting said wheel with the transmission shaft, whereby said shaft and wheel rotate together and the latter can be adjusted to automatically move transversely of the disk while engaged with both said disk and transmission shaft.

5. In a variable speed friction gearing, the combination of a driving disk, a driven shaft, a gear casing mounted on said driven shaft, a gear on the driven shaft within said casing, a transmission shaft, a bearing for said shaft mounted on said casing and adapted to rock about the axis of said shaft, a gear connected to the transmission shaft and engaging said gear on the driven shaft within said casing, and a friction wheel mounted on the transmission shaft to rotate therewith and adapted to move longitudinally thereof, said wheel engaging the driving disk, whereby the transmission shaft is adapted to swing in a plane at right angles to the driven shaft and is given sufficient stability to resist the reaction due to turning the driven shaft.

6. The combination of a driving disk, a driven shaft, a gear mounted on said shaft, a casing mounted to rock about said shaft and surrounding said gear, a transmission shaft having a bearing in said casing and adapted to rock therewith about the axis of the driven shaft and about an independent axis intermediate of its length, a gear on said transmission shaft engaging the aforesaid gear on the driven shaft, and a friction wheel mounted on the transmission shaft and engaging the driving disk, the motion of the transmission shaft about its intermediate axis acting to relieve the driving gear from shocks and strains due to vertical vibrations of the driving disk or driven shaft.

7. The combination with a driving shaft and a driven shaft, of a transmission shaft mounted to oscillate about an axis intermediate of its length, and gearing connecting said transmission shaft on opposite sides of said axis with the driving and driven shafts, respectively, the parts being so arranged that said transmission shaft will be oscillated about its said axis as the driving or driven shaft are vibrated vertically and the movements of the gearing on opposite sides of said axis will substantially compensate each other and relieve the gearing from shocks and strains.

8. In a variable speed friction gearing, the combination of a rotatable disk, a transmission shaft, a wheel mounted on said shaft and frictionally engaging one face of the disk, means for rocking said shaft to shift the friction wheel relative to the said disk and cause said wheel to automatically traverse the engaged face of the disk, and means for locking the shaft against such movement when the plane of revolution of the friction wheel is perpendicular to the radius of the disk extending through the point of contact between the wheel and disk.

9. In a variable speed friction gearing, the combination of a rotatable disk, a friction wheel engaging one face of said disk, means for causing said wheel to automatically traverse the disk while engaged therewith, and beveled supporting rollers bearing against a beveled surface on the opposite face of the disk from that engaged by the friction wheel.

10. In a variable speed friction gearing, the combination of a rotatable disk, bars stationarily mounted on opposite sides of the disk, a friction wheel mounted to slide on said bars and engaging one face of said disk, and supporting rollers mounted on said stationary bars and engaging the opposite face of the disk from that engaged by the friction wheel.

11. In a variable speed friction gearing, the combination of a driving disk, a driven shaft, a friction wheel engaging the disk and adjustable transversely thereof, and a transmission shaft connecting said wheel and the driven shaft and adapted to oscillate about the axis of the driven disk and also movable about the axis of the driven shaft.

12. In a variable speed friction gearing, the combination of a driving disk, a driven shaft, a friction wheel engaging the disk and adjustable transversely thereof, a transmitting shaft connecting said wheel and the driven shaft, and mounted in vertically adjustable bearings, and means for adjusting said bearings to vary the relative positions of the friction wheel and disk for the purpose described.

13. In a variable speed friction gearing, the combination of a driving disk, a driven shaft, a friction wheel engaging said disk and adjustable transversely thereof, stationary guides on opposite sides of the axis of the disk, a transmission shaft connecting the friction wheel and driven shaft and having its bearings mounted in said guides, a rock shaft, and connections between said rock shaft and the bearings of the transmission shaft, whereby said bearings and the shaft mounted therein can be adjusted to vary the relative positions of the friction wheel and driving disk, for the purpose described.

14. In a variable speed friction gearing, the combination of a driving disk, a driven shaft, a friction wheel engaging one face of the disk and movable transversely thereof a transmission shaft connecting the friction wheel and driven shaft, a bail connecting the bearings of said transmission shaft and adapted to oscillate about an axis normally in alinement with the axis of the driving disk, and means for shifting said bail and the transmission shaft, about another axis to vary the relative positions of the friction wheel and driving disk, for the purpose described.

15. In a variable speed friction gearing, the combination of a driving disk, a driven shaft, a friction wheel engaging the disk and adjustable transversely thereof, a transmission shaft connecting the friction wheel and driven shaft and mounted in movable bearings, a bail connecting said bearings of the transmission shaft, a rock shaft, and means connecting said rock shaft with the bail, whereby, by actuating the rock shaft the bearings of the transmission shaft and said shaft can be adjusted to vary the relative position of the friction wheel and driving disk, for the purpose described.

16. In a variable speed gearing, the combination of a driving disk, a driven shaft, a friction wheel engaging one face of the disk, a pair of stationary guides arranged on opposite sides of the axis of the disk, a transmission shaft connecting the friction wheel and driven shaft and mounted in bearings adjustably fitted in said guides, a bail connecting said bearings of the transmission shaft, a rock shaft mounted in bearings on said guides, and means connecting said rock shaft and bail and permitting the latter and the transmission shaft to vibrate about the axis of the rock shaft to vary the relative positions of the friction wheel and disk and to vibrate about an independent axis without varying the position of the wheel relative to the disk.

17. In a variable speed gearing, the combination of a driving disk, a driven shaft, a friction wheel engaging one face of the disk, a pair of stationary guides arranged on opposite sides of the axis of the disk, a transmission shaft connecting the friction wheel and driven shaft and mounted in bearings adjustably fitted in said guides, a bail connecting said bearings of the transmission shaft, a rock shaft mounted in bearings on said guides, and means pivotally connecting said rock shaft and bail and permitting the latter and the transmission shaft to vibrate about the axis of the rock shaft to vary the relative positions of the friction wheel and disk and to vibrate about the pivotal support of the bail without varying the position of the wheel relative to the disk.

18. In a variable speed gearing for motor vehicles, the combination of a driving disk, a driven axle, a friction wheel engaging one face of the disk, and adjustable transversely of the disk, and a transmission shaft connecting the friction wheel and said axle, and adapted to rock about an axis transverse of its length, said parts being so arranged that the oppositely acting forces exerted on the transmission shaft by the driving disk and axle substantially counterbalance each other.

19. In a variable speed friction gearing, the combination of a rotatable disk, a friction wheel engaging one face of the disk and automatically movable transversely thereof, power transmitting devices connected with said wheel, and a plate arranged at the center of the disk and having its outer face flush with the face of the disk, said plate and disk being rotatably connected, and the friction wheel arranged in such relation to said parts that it may be caused to traverse the disk to or from the center thereof on either side and when at or near the center of the disk can be run on to the rotatable plate substantially as and for the purpose described.

20. In a variable speed friction gearing, the combination of a rotatable disk, a friction wheel engaging one face of the disk and automatically movable transversely thereof, power transmitting devices connected with said wheel, a plate fitted loosely within a socket at the center of the disk and having its outer face flush with the surface of the disk, and a series of antifriction balls arranged between said plate and disk, and the friction wheel arranged in such relation to said parts that it may be caused to traverse the disk to or from the center thereof on either side and when at or near the center of the disk can be run onto the rotatable plate substantially as and for the purpose described.

21. In a friction gearing, the combination of a disk, a guide extending across one face of said disk and having a plurality of longitudinal grooves formed in its outer surface, a friction wheel having a hub surrounding said guide, and rollers mounted in said hub, on opposite sides of the wheel thereon, and extending into the grooves in the guide.

22. In a friction gearing, the combination of a disk, a guide extending across one face of the disk, and having formed in its outer surface longitudinally extending grooves, a friction wheel having its hub surrounding said guide, and rollers mounted in the hub of the friction wheel extending into the said grooves in the guide, and ball bearings for said rollers.

23. In a friction gearing, the combination with a disk, and a guide extending across one face of the disk, of a friction wheel engaging said face of the disk, a plurality of rollers mounted in the hub of said wheel and arranged to engage and travel longitudinally of said guide, and a series of balls arranged between the hub of the wheel and the faces of said rollers, substantially as and for the purpose described.

24. In a friction gearing, the combination with a disk, and a guide extending across one face of the disk, of a friction wheel engaging said face of the disk, a plurality of shafts supported by said wheel, rollers mounted on said shafts and arranged to engage and travel longitudinally of said guide, a series of balls arranged between the hub of the wheel and the faces of said rollers, and means for moving the shafts of said rollers toward the guide, substantially as and for the purpose described.

25. In a friction gearing, the combination with a disk and a guide extending across one face of the disk, of a friction wheel engaging said face of the disk and having its hub surrounding said guide, a plurality of rollers engaging said guide, shafts for said rollers mounted in bearings in the hub, wedge shaped blocks for adjusting said roller shafts toward the guide; and antifriction balls arranged between the faces of the rollers and said wedge shaped blocks, substantially as and for the purpose described.

26. In a friction gearing, the combination with a disk, and a guide extending across one face of the disk, of a friction wheel engaging said disk and adapted to be moved longitudinally of the guide, and antifriction bearings supporting said wheel and arranged to occupy the same relation to the wheel throughout the travel thereof.

27. In a friction gearing, the combination of a rotatable disk, a plate arranged centrally of and rotatably connected with said disk, a friction wheel contacting with the disk and having its axis normally in a line formed by the intersection of two planes, one containing the axis of the disk and the other extending parallel with the face of the disk, and means for effecting relative movement between the disk and wheel to shift the axis of the wheel in the plane parallel to the face of the disk and to either side of said normal line, to cause the wheel to traverse the disk to or from the center thereof, on either side, said means being so arranged that when the wheel is at or near the center of said disk it can be run onto said rotatable plate where it will remain stationary while the disk continues to revolve, such change being effected without varying the pressure of the wheel on the disk or causing it to slip thereon.

28. In a friction gearing, the combination of a rotatable disk, a plate arranged centrally of and rotatably connected with said disk, of a friction wheel contacting with the disk and having its axis normally in a line formed by the intersection of two planes, one containing the axis of the disk and the other extending parallel with the face of the disk, and means for effecting relative movement between the disk and wheel to shift the axis of the wheel in the plane parallel to the face of the disk and to either side of said normal line, to cause the wheel to traverse the disk to or from the center thereof, on either side, said means being so arranged that when the wheel is at or near the center of said disk it can be run onto said rotatable plate where it will remain stationary while the disk continues to revolve, such change being effected without varying the pressure of the wheel on the disk, and whereby the wheel may be caused to move from said central plate on either side of the center without varying the pressure, backing off, slipping the wheel on the disk, or in any manner disengaging said parts.

29. In a friction gearing, the combination of a rotatable disk, having a central plate rotatably connected therewith, a friction wheel contacting with the disk and having its axis normally in a line formed by the intersection of two planes, one containing the axis of the disk and the other extending parallel with the face of the disk, and means for positively shifting the axis of the wheel in the plane parallel to the face of the disk and to either side of said normal line, to cause the wheel to traverse the disk to or from the center thereof to vary the speed and past the center of the disk to reverse the direction of movement of the driven parts automatically, and adapted to be run off or onto the central plate without varying the pressure of the wheel, or sliding the same on the disk, or backing off or disengaging the parts in any manner.

In testimony whereof I affix my signature, in presence of two witnesses.

EDWARD P. COWLES.

Witnesses:
G. K. CANFIELD,
S. B. CRAIG.

Copies of this patent may be obtained for five cents each, by addressing the "Commissioner of Patents, Washington, D. C."